United States Patent [19]

Morguet et al.

[11] Patent Number: 4,663,301

[45] Date of Patent: May 5, 1987

[54] PROCESS FOR THE HOMO- AND COPOLYMERIZATION OF ETHYLENE

[75] Inventors: Hermann Morguet, Wesel-Obrighoven; John Hobes, Dinslaken; Walter Spaleck, Bocholt; Wolfgang Payer, Wesel, all of Fed. Rep. of Germany

[73] Assignee: Ruhrchemie Aktiengesellschaft, Fed. Rep. of Germany

[21] Appl. No.: 797,230

[22] Filed: Nov. 12, 1985

Related U.S. Application Data

[62] Division of Ser. No. 656,454, Oct. 1, 1984, Pat. No. 4,590,247.

[30] Foreign Application Priority Data

Oct. 1, 1983 [DE] Fed. Rep. of Germany ....... 3335823

[51] Int. Cl.$^4$ .............................................. C08F 4/64
[52] U.S. Cl. .................................... 502/110; 502/133; 502/134
[58] Field of Search ....................... 502/110, 133, 134

[56] References Cited

U.S. PATENT DOCUMENTS 4,144,390 3/1979 Derrditte et al. ............... 502/133 X
4,412,939 11/1983 Shipley et al. .................. 502/134 X

FOREIGN PATENT DOCUMENTS 1394378 5/1975 United Kingdom .

*Primary Examiner*—Patrick P. Garvin
*Attorney, Agent, or Firm*—Jordan B. Bierman

[57] ABSTRACT

The homo- or copolymerization of ethylene at temperatures of 150° C. to 350° C. and pressures of 300 to 3500 bar is carried out in the presence of catalysts having an organometallic compound of a metal of Group III of the Periodic Table of the Elements and a titanium compound. The titanium compound is the reaction product of (a) a titanic acid ester and (b) the product of the reaction of a magnesium alcoholate and a halogen-containing aluminum alkyl compound.

3 Claims, No Drawings

PROCESS FOR THE HOMO- AND COPOLYMERIZATION OF ETHYLENE

This is a division of Ser. No. 656,454 filed Oct. 1, 1984, and now U.S. Pat. No. 4,590,247.

The Application claims the priority of West German Application P No. 33 35 823.0, filed Oct. 1, 1983.

The present invention relates to a process for the homo- and copolymerization of ethylene at pressures of 300 to 3500 bar in the presence of certain catalysts.

It is known that ethylene can be polymerized alone or together with other olefins are elevated temperatures and pressures via an ionic mechanism in the presence of Ziegler type catalysts. These catalysts contain compounds of titanium III or IV and activating agents of organic aluminum compounds.

It has become apparent that not all Ziegler catalysts are suitable for such homo- or copolymerizations of ethylene. The requirements which the catalysts must meet differ considerably from those which are necessary for the same catalysts in low temperature and pressure processes. For example, the high temperature and pressure catalyst systems must continue to be active at temperature of 150° C. and above. However, most Ziegler catalysts rapidly become inactive or produce low yields under such conditions.

Also, high pressure polymerization is technically feasible only if the catalyst suspension can be easily pumped with high pressure pumps.

The catalyst system should not cause the dimerization of ethylene to 1-butene.

As only part of the ethylene (up to about 30%) is converted to polyethylene in one reactor pass in high pressure polymerization, the unreacted gas must be recycled to increase efficiency. If catalysts are used which promote dimerization to 1-butene, high concentrations of 1-butene are obtained in the recycled gas. Such catalysts effectively preclude the ability to obtain homopolymers of ethylene or copolymers of ethylene exclusive of those containing butene. For example, when ethylene and 1-hexene are the feed monomers, dimerization promoting catalysts produce terpolymers of ethylene/1-butene/1-hexene. This is an extreme disadvantage, especially in view of the superior properties of ethylene/1-hexene over ethylene/1-butene and the large industrial preference for ethylene/1-hexene copolymers. A solution to the "butene" problem is to remove the butene from the gas before recycling it. However, this procedure is expensive and economically impractical.

A further requirement is that the catalyst system, in addition to remaining active at polymerization temperatures above 150° C., should also yield products with high molecular weights. Finally, the catalysts must be easy to prepare from readily available components.

The Ziegler catalysts previously used for the high pressure polymerization of ethylene alone or together with other olefins do not fulfill all of the above requirements. Therefore, an object of this invention is the preparation of ethylene homo- and copolymers with a catalyst which overcomes the above defects.

A further object of the invention is the preparation of ethylene polymers by means of such a catalyst.

Surprisingly, these objectives are obtained by carrying out the process for the homo- or copolymerization of ethylene at temperatures of 150° to 350° C. and pressures of 300 to 3500 bar in the presence of catalysts comprising an organometallic compound of a metal of Group III of the Periodic Table of the Elements, preferably organoaluminium, (Component A) and a titanium compound (Component B). Representative organic groups in the organoaluminium compounds are alkyl, alkenyl, aryl, alkoxy. Examples for suitable compounds are triethyl aluminium, triisobutyl aluminium, tri-n-octyl aluminium, diethyl aluminium chloride, isoprenyl aluminium, dethyl aluminium ethoxide. The titanium compound is obtained by the reaction of (i) the reaction product of a magnesium alcoholate and a halogen-containing aluminium alkyl compound with (ii) a titanic acid ester.

In the preferred method of preparation of the titanium compound, a slurry of magnesium alcoholate is first formed in a suspension medium. Suitable suspension media include higher boiling hydrocarbons such as methylcyclohexane, isooctane or hydrocarbon fractions with a boiling point range somewhere between 100° and 180° C. A solution of halogen-containing aluminium alkyl compound is stirred into the suspension at about −20° to about 100° C. and left for a sufficient time, i.e. about 10 to about 600 minutes, for an after-reaction to take place. The solid reaction product is separated from the unreacted aluminium alkyl compound by means of repeated decantation.

Then, while the suspension of magnesium aluminium compound is stirred and heated from about 40° to about 120° C., the titanic acid ester is added dropwise to the suspension either in pure form or as a solution. When the reaction is complete, the solid obtained is washed several times to remove the unreacted titanic acid ester.

The molar ratio of halogen-containing aluminum alkyl compound to magnesium alcoholate is preferably from about 0.5 to about 5. A molar ratio of titanic acid ester to magnesium alcoholate of from about 0.01 to about 10 is preferred. The atomic ratio of the titanium in Component B to the metal of the organometallic compound of Component A is from about 1:0.1 to 1:200.

Magnesium alcoholates are preferably derived from low molecular weight aliphatic alcohols; alcohols with 1 to 8 carbon atoms are particularly suitable. Examples of such alcohols are ethanol, isopropanol, n-butanol and iso-butanol. Magnesium ethylate is preferred. When more than one alcoholic group is present, they are selected independently of one another.

Monoalkylaluminumdihalides, dialkylaluminummonohalides and mixtures of these two classes of compounds can be used as halogen-containing aluminum alkyl compounds. The alkyl groups present in the aluminum compounds can be the same of different and each alkyl group can have 1 to 12, preferably 1 to 4, carbon atoms. Examples of such compounds are diethylaluminum monochloride, ethylaluminum dichloride, ethylaluminum sesquichloride and isobutylaluminum dichloride. Other examples include the analogous bromides, iodies, fluorides.

The titanic acid esters correspond to the general formula $Ti(OR)_4$, wherein R is an alkyl group having 1 to 30, preferably 1 to 20, carbon atoms or an aryl group having 6 to 20 carbon atoms. The R groups may be the same or different; it is possible to use mixed titanic acid ester, i.e. compounds which contain different alkyl and aryl groups in the same molecule. It is also possible to use polytitanates, $RO-(Ti(OR)_2O)_xR$ wherein each R is as defined above, such as butylpolytitanate, $nC_4H_9-O(Ti(O-nC_4H_9)_x-nC_4H_9$, wherein x can vary from 2 to 20. Examples of particularly suitable titanic acid esters are $Ti(OC_2H_5)_4$, $Ti(O-isoC_3H_7)_4$ an $Ti(O-nC_4H_9)_4$.

The actual catalyst system is formed by reacting the titanium compounds prepared as described above (Component B) with Component A. It is also possible to pre-activate the titanium components by known methods with an aluminium alkyl compound and to pre-polymerize them with an α-olefin, e.g. 1-hexene. With this method the pumpability of the catalyst suspension can be improved.

The catalyst system is fed via high pressure pumps into the reactor either in the form of a mixture or as a suspension or solution of its components in higher boiling hydrocarbons, the quantities being sufficient to permit the required reaction temperature to be attained.

The polymerization of ethylene alone or together with other olefins can be carried out both in autoclaves and in tubular reactors. Polymerization pressure is from about 300 to about 3500 bar and the polymerization temperature is from about 150° to about 350° C. To control the molecular weight, about 0.05 to about 5% by volume of hydrogen based on the amount of ethylene used is added to the reactor. However, considerably higher concentrations of hydrogen can also be used; this produces polymerizates with comparatively lower molecular weights (waxes).

Lower olefins, such as 1-propene, 1-butene, 1-hexene or 1-octene, are suitable as comonomers which are polymerized together with the ethylene. These comonomers are added to the reaction mixture by means of other high pressure pumps in amounts of about 0.5 to 75 per cent by weight based on the total amount of ethylene and comonomer. The polymer is formed as a melt and is passed, via separating systems in which separation of the gaseous and liquid constituents takes place, to an extruder and granulated.

The following Examples illustrate but do not limit the invention.

MFI 190/2.16 is the amount of polymerisate which flows out through a nozzle with a length of 1.8 mm and a diameter of 2.08 mm in 10 minutes at a temperature of 190° C. and a load of 2.16 kg.

EXAMPLE 1

(a) Preparation of the titanium compound:

Under a $N_2$ atmosphere, 192 g (1680 m mol) of Mg $(OC_2H_5)_2$ is added to 1600 ml of gasoline in a 4-liter three-necked flask. 1370 ml of a 1.3 molar solution (1781 m mol) of ethylaluminium dichloride in gasoline is added dropwise at 80° C. over a period of 30 minutes to the stirred system, which is then left to after-react for 5 hours at 80° C. with continued stirring.

The solid is washed at room temperature by siphoning off the top liquid phase and topping up with fresh gasoline until the top phase no longer contains any aluminium alkyl.

Under a $N_2$ atmosphere, 1000 ml of this solid suspenison (498 m mol Mg) is placed in a 4-liter three-necked flask. A solution of 24.4 g (100 m mol) of $Ti(OC_2H_5)_4$ in 80 ml gasoline is added dropwise at 80° C. over a period of 4 hours to the stirred system, which is then left to after-react for 1 hour at 80° C. with continued stirring. The solid is washed as described above until the top phase no longer contains any titanium. The suspension contain 70.7 m mol Ti/l and 44 m mol Mg/l.

(b) Pre-activation and pre-polymerization of the titanium-compound 113 ml of a 1.25 molar solution of diethylaluminium chloride in gasoline (containing 140 m mol diethylaluminiumchloride) is now stirred into the suspension at 65° C. over a period of 5 minutes (pre-activation), then 88.3 ml (710 m mol) of 1-hexene in 300 ml gasoline is added dropwise over a period of 15 minutes and stirred for 2 hours at 65° C. (pre-polymerization).

(c) Polymerization

Ethylene is continuously polymerized in a 0.5 l high pressure agitatior autoclave with a catalyst system consisting of the pre-activated and prepolymerized titanium compound of Example 1b as component B and diethylaluminium chloride (DEAC) as component A. At a reaction pressure of 1500 bar, 0.124 mmol Ti/h (component B) and 3 mmol Al/h (component A) are fed into the reactor in order to maintain a polymerization temperature of 230° C. The molcular weight of the polymer is regulated with 0,7 % hydrogen by volume based on the feed gas. The polyethylene melt is continuously passed through a separating system and granulated. Conversion is 12.4% based on the ethylene. The catalyst consumption is 0.13 m mol Ti/kg polyethylene.

The waste gas contains 0.45 % n-butene by weight. The granulate has a melt flow index (MFI 190/2.16) of 1.38 g/10 min, a crystalline melting point of 129° C., a density of 0.942 g/cm$^3$, and an impact tensile strength of 1450 mJ/mm$^2$.

EXAMPLE 2

As in Example 1, ethylene is polymerized in a high pressure agitator autoclave with a capacity of 0.5 l using $TiCl_3.AlCl_3$ as the catalyst system, which corresponds to the state of the art and is not the catalyst system according to the invention. Tri-n-octylaluminium is used as an activator. At a pressure of 1500 bar, 0.8 m mol Ti/h and 14 m mol Al/h are necessary to maintain a reaction temperature of 230° C. The molecular weight is regulated with 0.9% hydrogen by volume based on the feed gas. The melt is continuously pressed through a separating system and granulated. The conversion is 8.9% based on the ethylene and the catalyst consumption is 1.5 m mol Ti/kg polyethylene.

The waste gas contains 11.5% n-butene by weight. The granulate has a melt flow index (MFI 190/2.16) of 1.2 g/10 min, a crystalline melting point of 132° C., a density of 0.936 g/cm$^3$, and an impact tensile strength of 1200 mJ/mm$^2$.

EXAMPLE 3

In the same apparatus and under the same reaction conditions as described in Example 1, ethylene is copolymerized with 25% n-butene-1 by weight based on the ethylene. The molecular weight is adjusted with 0.5% hydrogen by volume based on the ethylene. 0.275 m mol Ti/h and 8 m mol Al/h are required to control the polymerization temperature. The n-butene content in the waste gas is not measured in this experiment.

The conversion is 16.5% based on the mixture of olefins and the catalyst consumption is 0.11 m mol Ti/kg polyethylene. The granulate has a melt flow index (MFI 190/2.16) of 1.1 g/10 min, a crystalline melting point of 127° C., a density of 0.936 g/cm$^3$, and an impact tensile strength of 1875 mJ/mm$^2$.

EXAMPLE 4

In the same apparatus and under the same reaction conditions as Example 1, ethylene is copolymerized with 32% hexene based on the ethylene. The molecular weight is adjusted with 0.20% hydrogen by volume. The conversion is 18.4% based on the mixture of olefins, which corresponds to a feed of 0.18 m mol Ti/h and 7.5 m mol Al/h, and a catalyst consumption of 0.05 m mol Ti/kg polyethylene. The waste gas contains 0.55 % n-butene by weight.

The ethylene/hexene copolymer has a melt flow index (MFI 190/2.16) of 1.22 g/10 min, a crystalline melting point of 125° C., a density of 0.934 g/cm$^3$, and a impact tensile strength of 2250 mJ/mm$^2$.

EXAMPLE 5 (comparison)

With the catalyst system of Example 2 ethylene is copolymerized at 1500 bar and 230° C. with 15% hexene by weight based on the ethylene. The molecular weight is regulated by the addition of 0.5% hydrogen by volume to the ethylene. The feed rate is 1.1 m mol Ti/h and 18.5 m mol Al/h. The catalyst consumption is 1.23 m mol Ti/kg polyethylene for a conversion of 11.6% based on the olefin mixture. The waste gas contains 10.4% n-butene by weight.

The polymer has a melt flow index (MFI 190/2.16) of 0.90 g/10 min, a crystalline melting point of 127° C., a density of 0.931 g/cm$^3$ and an impact tensile strength of 1450 mJ/mm$^2$.

What we claim is:

1. A catalyst for homo- and copolymerization of ethylene comprising an organometallic compound of a metal of Group III of the Periodic Table of the Elements and a titanium compound obtained by reacting a titanic acid ester with the reaction product of a magnesium alcoholate and a halogen-containing alumium alkyl compound.

2. The catalyst of claim 1 wherein said titanium compound is Ti(OR)$_4$ wherein R is selected from alkyls having 1 to 30 carbon atoms and aryls having 6 to 20 carbon atoms.

3. A method of preparing a catalyst comprising reacting a magnesium alcoholate and a compound of Formula I $$Al(R^1)_n(Y)_{3-n} \qquad (I)$$

wherein n is 1 or 2, each R' is independently selected from alkyls and each Y is independently selected from halogen, to form a first product adding a titanic acid ester to said first product to form a second product and then combining said second product and an organometallic of a Group III metal of the Periodic Table of the Elements.

* * * * *